United States Patent
Wang et al.

(10) Patent No.: US 11,264,799 B2
(45) Date of Patent: Mar. 1, 2022

(54) SUBMODULAR LOAD CLUSTERING WITH ROBUST PRINCIPAL COMPONENT ANALYSIS

(71) Applicants: Yishen Wang, San Jose, CA (US); Haifeng Li, Nanjing (CN); Di Shi, San Jose, CA (US); Qibing Zhang, Nanjing (CN); Chunlei Xu, Nanjing (CN); Zhiwei Wang, San Jose, CA (US)

(72) Inventors: Yishen Wang, San Jose, CA (US); Haifeng Li, Nanjing (CN); Di Shi, San Jose, CA (US); Qibing Zhang, Nanjing (CN); Chunlei Xu, Nanjing (CN); Zhiwei Wang, San Jose, CA (US)

(73) Assignees: State Grid of China, State Grid Jiangsu Electric Power Co Ltd; Global Energy Interconnection Research Institute; State Grid Jiangxi Electric Power Co, Geirina

( * ) Notice: Subject to any disclaimer, the term of this patent is extended or adjusted under 35 U.S.C. 154(b) by 464 days.

(21) Appl. No.: 16/392,494

(22) Filed: Apr. 23, 2019

(65) Prior Publication Data
US 2020/0144816 A1    May 7, 2020

Related U.S. Application Data

(60) Provisional application No. 62/757,097, filed on Nov. 7, 2018.

(51) Int. Cl.
*H02J 13/00*  (2006.01)
*G05B 13/04*  (2006.01)
*H02J 3/00*   (2006.01)

(52) U.S. Cl.
CPC .............. *H02J 3/00* (2013.01); *G05B 13/048* (2013.01); *H02J 13/0006* (2013.01); *H02J 3/003* (2020.01); *H02J 2203/20* (2020.01)

(58) Field of Classification Search
CPC .......... H02J 3/00; H02J 13/0006; H02J 3/003; H02J 2203/20; H02J 2203/10;
(Continued)

(56) References Cited

U.S. PATENT DOCUMENTS

2018/0351355 A1*  12/2018  Chen .................... H02J 3/00

OTHER PUBLICATIONS

PHD thesis "Energy Storage Operation with Wind Uncertainty", by Yishen Wang, published [online] in August 2017[retrieved on Sep. 24, 2021], Retrieved from "https://digital.lib.washington.edu/researchworks/handle/1773/40041?show=full" (Year: 2017).*

(Continued)

*Primary Examiner* — Thomas C Lee
*Assistant Examiner* — Charles Cai
(74) *Attorney, Agent, or Firm* — PatentPC; Bao Tran

(57) ABSTRACT

Systems and methods manage electrical loads in a grid by applying Robust principal component analysis (R-PCA) to decompose annual load profiles into low-rank components and sparse components; extracting one or more predetermined features; constructing a similarity graph; selecting submodular cluster centers through the constructed similarity graph; determining a cluster assignment based on selected centers; and applying the clustering assignment for load analysis.

18 Claims, 6 Drawing Sheets

(58) Field of Classification Search
CPC ....... G05B 13/048; Y02B 90/20; Y04S 20/00; Y04S 10/50
See application file for complete search history.

(56) References Cited

OTHER PUBLICATIONS

Y. Wang, Y. Liu and D. S. Kirschen, "Scenario Reduction With Submodular Optimization," in IEEE Transactions on Power Systems, vol. 32, No. 3, p. 2479-2480, May 2017, https://doi.org/10.1109/TPWRS.2016.2603448 (Year: 2017).*

Emmanuel J. Candès, Xiaodong Li, Yi Ma, John Wright, "Robust principal component analysis?", Journal of the ACM, vol. 58, Issue 3, May 2011, Article No. 11 pp. 1-37, https://doi.org/10.1145/1970392.1970395 (Year: 2011).*

\* cited by examiner

Algorithm 1 Submodular cluster center selection algorithm

1: Initialize $\Gamma \leftarrow \emptyset$, $f(\Gamma) \leftarrow 0$,
2: for $i = 1, 2, \cdots, N^I$ do
3:     $v_i \leftarrow f(i)$
4: end for
5: while $card(\Gamma) \leq K$ do
6:     $j \leftarrow arg\max_{i \in \Omega \setminus \Gamma} v_i$
7:     $\delta \leftarrow f(\Gamma \cup \{j\}) - f(\Gamma)$
8:     $v_j \leftarrow \delta$
9:     if $\delta > \max_{i \in \Omega \setminus (\Gamma \cup j)} v_i$ then
10:        $\Gamma \leftarrow \Gamma \cup \{j\}$ {Diminishing return property}
11:        $v_j \leftarrow 0$
12:    else if $\delta \leq 0$ then
13:        Break {Solution is (locally) optimal}
14:    end if
15: end while
16: return $\Gamma$

FIG. 1

SUBMODULAR LOAD CLUSTERING WITH ROBUST PRINCIPAL COMPONENT ANALYSIS

BACKGROUND

The present invention relates to electrical load analysis.

Load has been one of the fundamental parts of power systems since the systems exist. Conventionally, load components include electric heaters, Heating, Ventilation, and Air Conditioning (HVAC), household electric appliances (refrigerators, TV, washer, dryer, dishwasher, etc.), lighting load, induction motors (industrial and agricultural), industrial facilities.

From the perspective of transmission system operators, load bus represents the aggregated load for all the downstream loads within the sub-transmission and distribution systems. Currently, there is an increasing trend to deploy distributed resources in the system, such as PV, demand response, EV, and energy storage. In addition, AC microgrids, DC microgrids or hybrid AC/DC microgrids can also be viewed as aggregated loads. Under this paradigm, originally passive load is becoming more and more active, which places new challenges on load analysis for system operation and planning.

In power systems, there are various load analysis applications, including load forecasting, load modeling, load disaggregation, and load clustering. Within these applications, load clustering serves as an effective intermediate step to improve the performances of others. Considering the intrinsic load pattern similarities, it is not practical and not necessary to fit every single load bus with a unique model in a realistically-sized system. Loads within the same cluster can share the same parameter set for modeling and forecasting. In addition, as load behavior randomness always exists, load clustering helps load modeling and load forecasting to learn a more generalized model.

However, traditional load analysis is facing challenges with the new electricity usage patterns due to demand response as well as increasing deployment of distributed generations, including photovoltaics (PV), electric vehicles (EV), and energy storage systems (ESS). At the transmission system, despite of irregular load behaviors at different areas, highly aggregated load shapes still share similar characteristics. Load clustering is used to discover intrinsic patterns and provide useful information to other load applications, such as load forecasting and load modeling.

SUMMARY

In one aspect, a submodular load clustering method is disclosed for transmission-level load areas. Robust principal component analysis (R-PCA) firstly decomposes the annual load profiles into low-rank components and sparse components to extract key features. A submodular cluster center selection technique is then applied to determine the optimal cluster centers through constructed similarity graph. Following the selection results, load areas are efficiently assigned to different clusters for further load analysis and applications.

In another aspect, systems and methods manage electrical loads in a grid by applying Robust principal component analysis (R-PCA) to decompose annual load profiles into low-rank components and sparse components; extracting one or more predetermined features; constructing a similarity graph; selecting submodular cluster centers through the constructed similarity graph; determining a cluster assignment based on selected centers; and applying the clustering assignment for load analysis.

Advantages of the system may include one or more of the following. The R-PCA is applied to decompose the load time series into low-rank and sparse components to extract key features. In addition, R-PCA also effectively mitigates data quality issues caused by corrupted data or missing values. The submodular selection technique is used to determine cluster centers. Load areas are ranked in order as the center candidates, where higher order indicates higher priority to be chosen as the cluster centers. According to such rank, without repeating the whole clustering process, a different total cluster number K simply requires picking K first candidates and re-assigning load profiles. This greatly improves the overall clustering efficiency. Unlike K-Means, this method is deterministic, so the clustering results are stable without randomness. The system improves over traditional load analysis, which is facing challenges with the new electricity usage patterns due to demand response as well as increasing deployment of distributed generations, including photovoltaics (PV), electric vehicles (EV), and energy storage systems (ESS). The system provides an efficient submodular load clustering method for transmission-level load areas. Load areas can be efficiently assigned to different clusters for further load analysis and applications.

BRIEF DESCRIPTIONS OF FIGURES

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 1 shows an exemplary submodular cluster center selection process.

DETAILED DESCRIPTION OF THE ILLUSTRATED EMBODIMENTS

Figure 2:
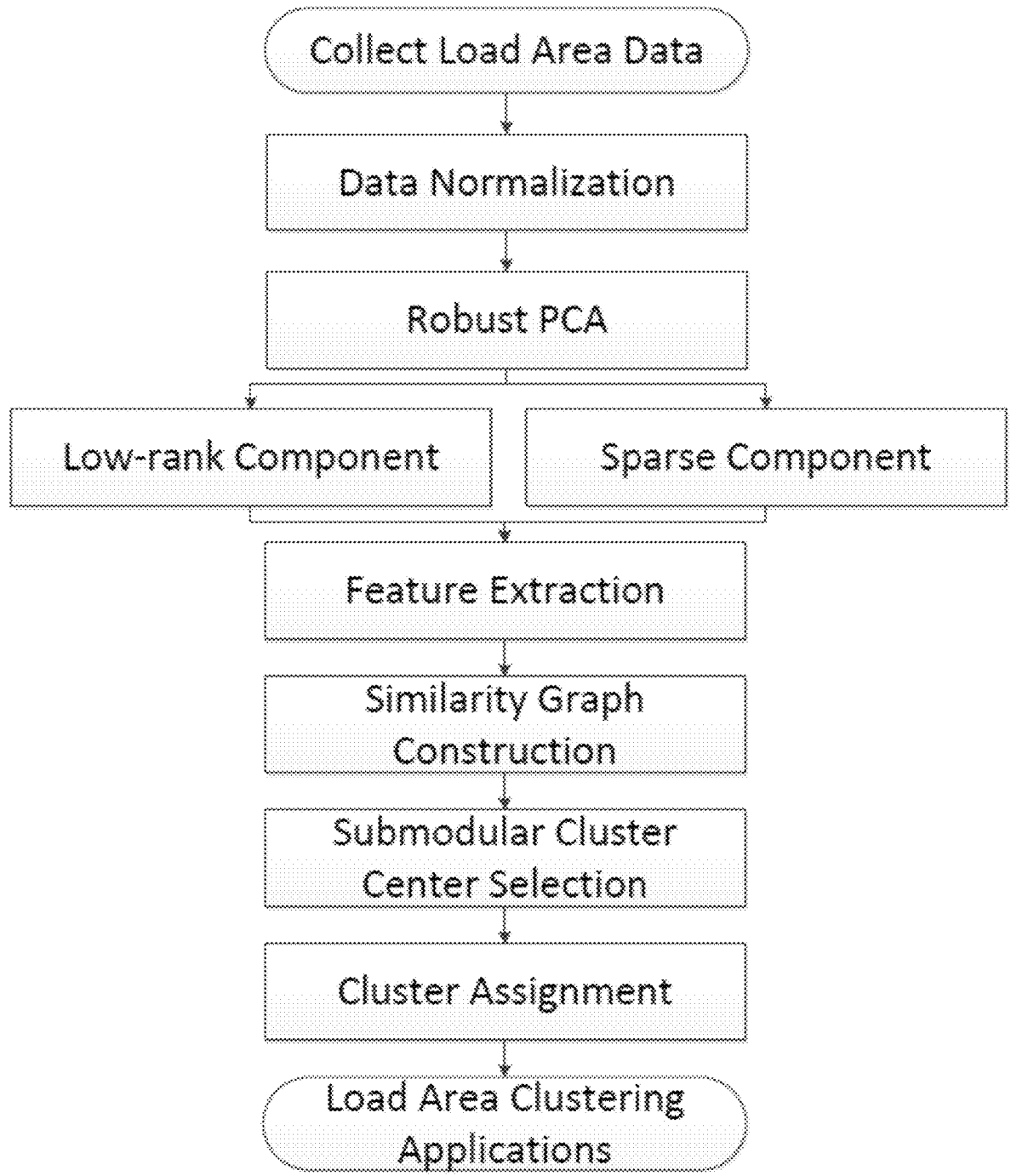
FIG. 2 shows an exemplary Submodular-based Clustering Flowchart.

An efficient submodular load clustering method for transmission-level load areas is detailed next. Robust principal component analysis (R-PCA) firstly decomposes the annual load profiles into low-rank components and sparse components to extract key features. A novel submodular cluster center selection technique is then applied to determine the optimal cluster centers through constructed similarity graph. Following the selection results, load areas are efficiently assigned to different clusters for further load analysis and applications.

Initially, Data Normalization is done as a starting point for the submodular load clustering method. After collecting $N^I$ load area data from the database, each load area i is represented with a column vector $x_i \in R^{N^T}$ recording historic annual load profiles with $N^T$ measurements. Different load areas typically own different peak load $X_i^{max}$, which ranges from 200 MW to 20 GW for PJM. For computation stability and ease of comparison, these profiles are normalized with feature scaling to have scales between 0 and 1 as shown in equation (1.1). Then, a load data matrix M with size $N^T \times N^I$ is generated. Each column $y_i \in R^{N^T}$ represents a normalized load profile.

$$y_i = \frac{x_i - X_i^{min}}{X_i^{max} - X_i^{min}} \qquad (1.1)$$

Next, Robust Principal Component Analysis is done. Principal component analysis (PCA) has been widely used to reduce the data dimension and extract features. Conventionally, this PCA can be formulated with the optimization form as shown in equations (1.2). The goal is to find a rank-k component L to minimize the $l_2$-norm of reconstruction errors between the original data M and low-rank component L. Singular value decomposition (SVD) is commonly used for solving this problem.

$$\text{minimize } \|M-L\| \text{subject to rank}(L) \leq k \qquad (1.2)$$

However, PCA cannot perform well when the data is not thoroughly cleaned. Corrupted measurements could lead to poor reduction results even with single grossly corrupted errors. Since real-world applications always come with data quality issues, a robust version is necessary to extend the existing PCA work. Robust PCA (R-PCA) can be used to robustify conventional PCA. In power systems, R-PCA has also been applied in the data cleaning [21] and false data injection.

In one embodiment, R-PCA serves as the filter to decompose the normalized load data into low-rank and sparse components, whose information will be further extracted. Even though PCA itself is a linear mapping to transform data, keeping both components in this robust version still withholds as much information as possible, and suits for load time series analysis.

The Principal Component Pursuit (PCP) form of R-PCA is shown in equations (1.3), whose objective is to minimize the weighted sum of the nuclear-norm of low-rank matrix L and $l_1$-norm of sparse matrix S, subject to the original matrix condition. Nuclear norm computes the sum of singular values of matrix as in (1.4), and $l_1$-norm enforces sparsity for the matrix S as in (1.5).

$$\text{minimize } \|L\|_* + \mu \|S\|_1 \qquad (1.3)$$
$$\text{subject to } L + S = M$$

$$\|L\|_* = \sum_p \sigma_p(L) \qquad (1.4)$$

$$\|S\|_1 = \sum_{ij} |S_{ij}| \qquad (1.5)$$

Another unique and remarkable feature for this formulation is that no tuning parameter is required. Weighting factor $\mu$ is theoretically determined with equation (1.6) under mild conditions.

$$\mu = \frac{1}{\sqrt{\max(N^T, N^I)}} \qquad (1.6)$$

This tractable convex optimization can be solved to recover the original data matrix efficiently and exactly in the PCP form. In addition, algorithms like iterative thresholding, accelerated proximal gradient, augmented Lagrangian multipliers can also be applied to solve this problem.

Next, the feature extraction process is detailed. With decomposed low-rank and sparse components from the normalized load profiles, load area feature vector length is actually doubled and quite long. The total feature number reaches $2 \times N^T$ for each area. For hourly metered load, annual feature numbers are $2 \times 8760 = 17520$. For smart meter data or Phasor Measurement Unit (PMU) data with much higher sampling rate, the total feature length is even longer. Directly feeding these long vectors for clustering does not help machine learning perform better. Instead, due to "curse of dimensionality", the algorithm may even perform worse. Therefore, intrinsic and representative load features need to be extracted.

One common feature extraction approach is through dimensionality reduction techniques like PCA or autoencoders. However, the number of features to be selected and the method to be used is still a data-dependent question.

Load time series are highly weather dependent, especially with temperatures. ISO New England temperature has a strong quadratic relationship with the load. In addition, there is a clear seasonal trend for both temperature and load. This seasonal load pattern difference motivates to capture such information through designed features. Rather than automatically extract features without clear physical meanings, a feature engineering approach is developed based on the understanding of the load data.

Following the convention in ISO New England load data, the whole year is split into winter and summer two seasons. The summer period is June to September, while the winter period is October to May. Even though this is the definition for ISO New England, the same principles can be applied to PJM as well.

For each season, the system extracts the seasonal average load, seasonal load standard deviation, seasonal maximum load and seasonal minimum load to form an area load feature set $z_i$. Due to the decomposed low-rank and sparse components from R-PCA, the total feature length for each area is 2(matrix component)×2(season)×4(feature)=16.

Similarity Graph Construction is discussed next. Similarity graph is constructed through the similarity matrix W and corresponding $w_{ij}$ for each load area pair. Distance metric with $l_2$-norm and similarity metric with radial basis kernel function (RBF) are computed with equations (1.7) and (1.8), where $z_i$ and $z_j$ are the load features for area i and j. Parameter $\lambda$ controls the similarity scaling. Typically, tuning $\lambda$ is based on pairwise $l_2$-norm distance distribution values.

$$d_{ij} = \|z_i - z_j\|_2 \qquad (1.7)$$

$$w_{ij} = e^{-\frac{d_{ij}}{\lambda}} \qquad (1.8)$$

Turning now to the Submodular Cluster Center Selection, submodular optimization has shown great success in providing computationally efficient and theoretically-bounded solutions to feature selection, training data selection and other machine learning applications. In power systems, such submodular optimization concept also presents satisfactory results in scenario reduction, PMU placement and storage siting.

Diminishing return property is discussed next. For every $X, Y \subseteq \Omega$ with $X \subseteq Y$ and every $x \in \Omega \backslash Y$, we have that $f(X \cup \{x\}) - f(X) \geq f(Y \cup \{x\}) - f(Y)$. Diminishing return property is one of the most important properties for submodular optimization. It states that the incremental gain from selecting one more element is always non-increasing. Therefore, this incremental gain has an upper bound which helps to derive efficient algorithms. Further, a simple greedy algorithm can solve the submodular function optimization with an optimality-bounded solution when it is monotone non-decreasing.

Motivated by the classic facility location problem, load clustering can be formulated as a submodular cluster center selection problem. Given $N^I$ load areas, the task is to find K load cluster centers to represent all $N^I$ load areas. From set function perspective, given original set $\Omega$, load cluster center selection tries to find a selected set $\Gamma$ to maximize the set-wise similarities between the original set $\Omega$ and selected set $\Gamma$, subject to the cardinality constraint. This has been formulated in discrete optimization problem (1.9).

$$f(\Gamma) = \max_{i \in \Omega} \left( \sum_{i \in \Omega} \max_{j \in \Gamma} w_{ij} \right) \quad (1.9)$$

$$\text{subject to} \quad \text{card}(\Gamma) \leq K$$

This formulation follows the facility location problem convention, so it is submodular with proof. As the objective is monotone non-decreasing, nice computational properties are applied to derive accelerated fast greedy algorithm. FIG. 1 presents the detailed algorithm to solve the load cluster center selection problem with guaranteed solution quality.

Basically, this accelerated algorithm firstly initializes each set element. Then, these initialized values serve as the upper bounds to efficiently select new set elements. Even though it is greedy, the solution is always optimal or near-optimal. As the objective is monotone non-decreasing, the algorithm will stop when the set cardinality K is met. In other words, the algorithm will finish when it finds K best cluster centers.

The K cluster centers are ranked with the selection order. Higher order suggests a higher priority to be chosen as the cluster center to represent remaining data points.

Turning now to Load Cluster Assignment, after obtaining the cluster center rank list or rank set $\Gamma$, arbitrary K-cluster can be determined through selecting first K load areas in the list as the cluster centers. Then, the rest load areas are assigned to the load area cluster centers with highest pairwise similarity as in equation (1.10).

$$c_i = \max_{j \in \Gamma} w_{ij} \quad (1.10)$$

By setting this K with a large value, any cluster number less than K is efficiently computed and assigned without repeating the entire clustering process. For example, to compare clustering results with the clustering number from 1 to K, the instant algorithm only conducts 1-time cluster center selection and K-time cluster assignments, whereas K-Means needs to perform K-time clustering operations and K-time cluster assignments. The computation efforts are greatly reduced especially when there are large number of data points to be clustered.

In addition, K-Means results heavily rely on the random initialization, so it generally needs to repeat several times to find the best clustering partition. On the contrary, the instant entire process is deterministic without randomness, and it has good interpretabilities due to this rank list as well.

The overall framework of the submodular load clustering method is presented in FIG. 2. The above efficient submodular load clustering method for transmission-level load areas. Robust principal component analysis (R-PCA) firstly decomposes the annual load profiles into low-rank components and sparse components to extract key features. The submodular cluster center selection technique is then applied to determine the optimal cluster centers through constructed similarity graph. Following the selection results, load areas are efficiently assigned to different clusters for further load analysis and applications. Numerical results obtained from PJM load demonstrate the effectiveness of the instant approach.

The instant submodular load clustering method are tested using PJM area load data. In this dataset, 27 load areas represent 27 fully metered electric distribution companies in the PJM territories. Year 2017 annual load profiles are chosen to represent most up-to-date load shapes due to the increasing deployment of distributed energy resources.

Figure 3:
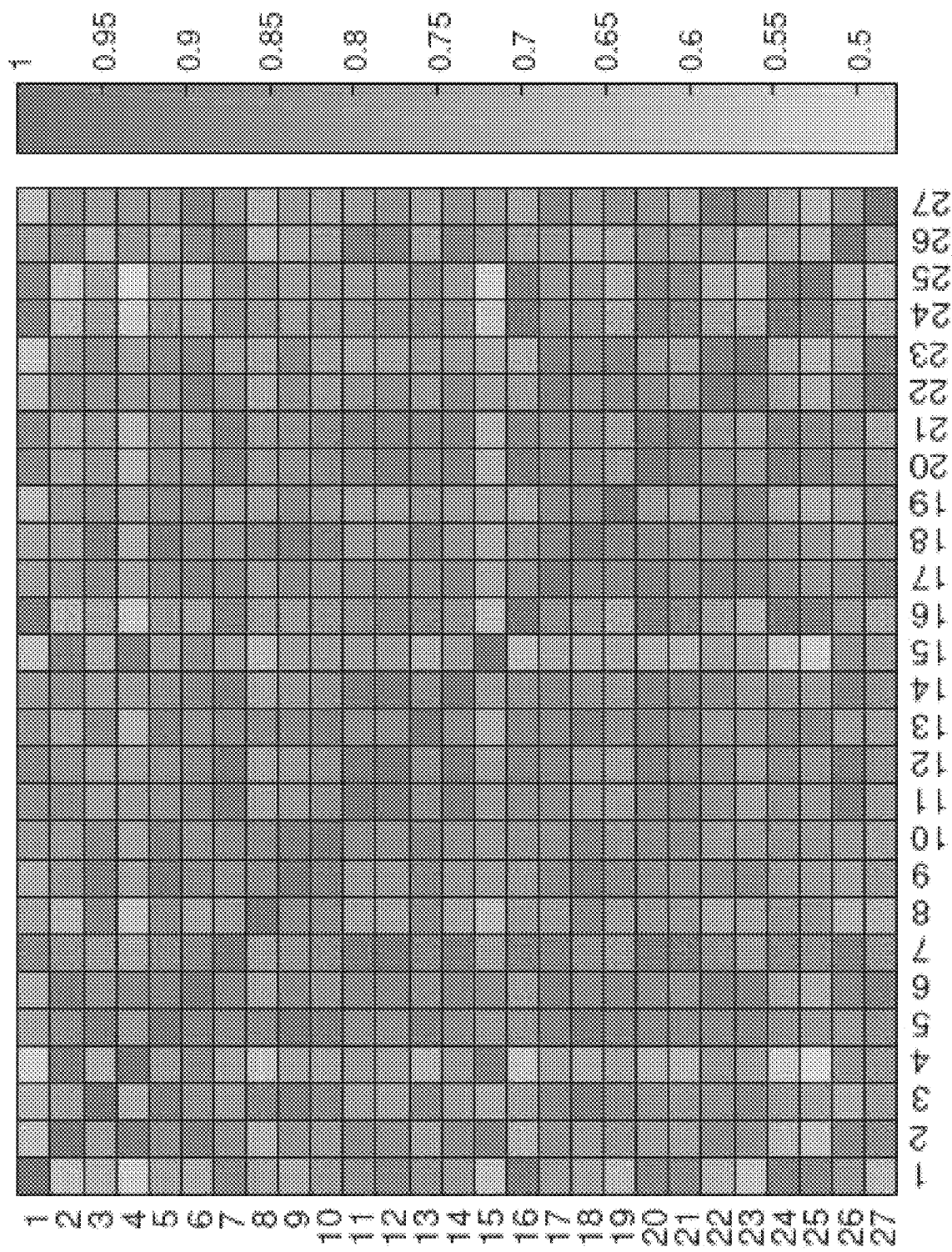
FIG. 3 shows an exemplary PJM Load Area Heatmap.

Numerical Results of the trials are discussed next. FIG. 3 shows the heatmap for 27 PJM load areas. Since each load area covers a distribution company, the load aggregation level is very high. It is not surprising to observe high similarities among most areas. However, several areas still show low correlations between each other indicating the existence of multiple clusters.

Figure 4:
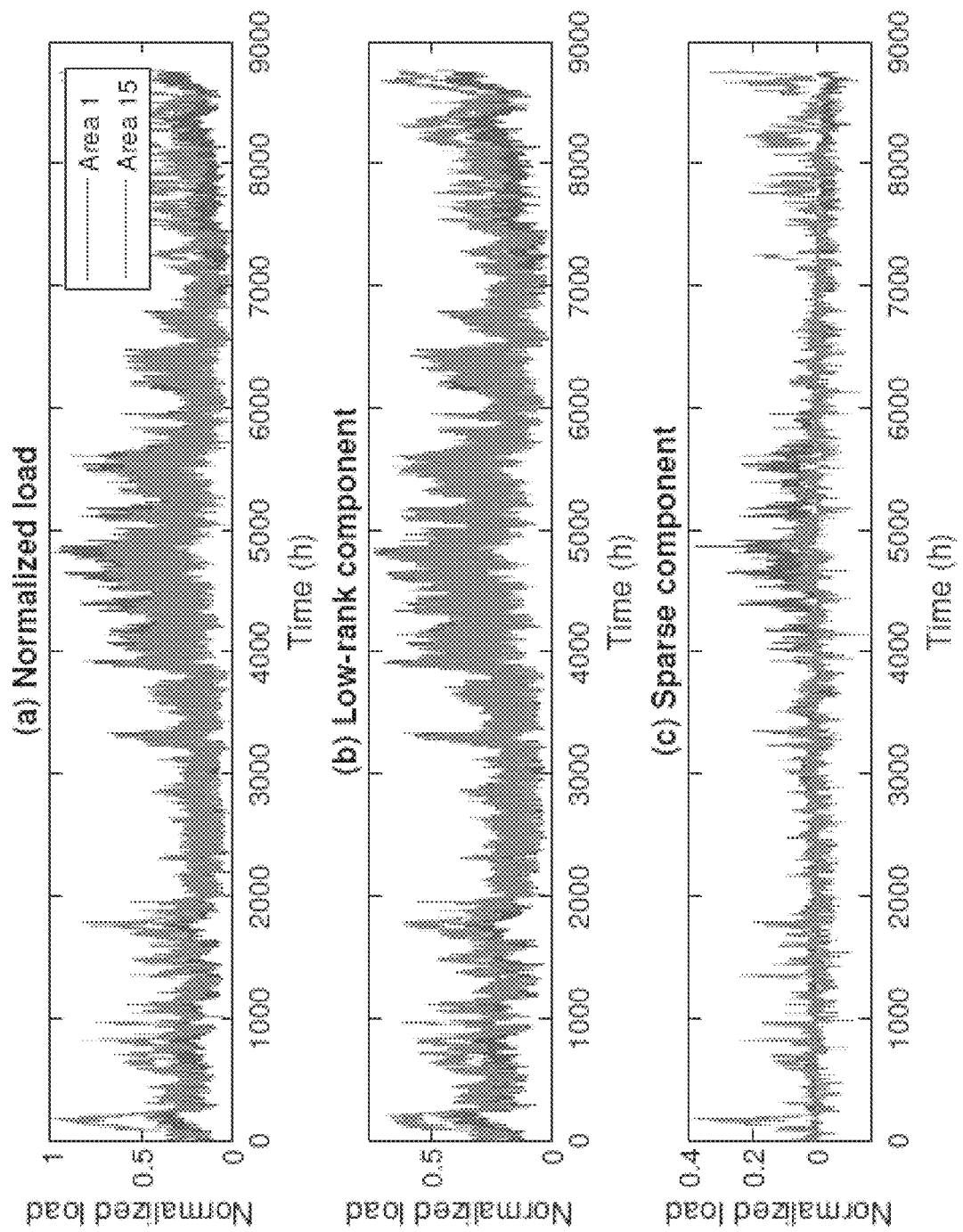
FIG. 4 shows an exemplary Robust PCA Examples

FIG. 4 shows one example for the robust PCA and feature extraction. Area 1 and Area 15 both have high summer peaks, whereas area 15 has higher winter peaks. Even though normalized profiles still show such difference, through R-PCA, the sparse components clearly distinguish such pattern difference and provide useful features for clustering.

Figure 5:
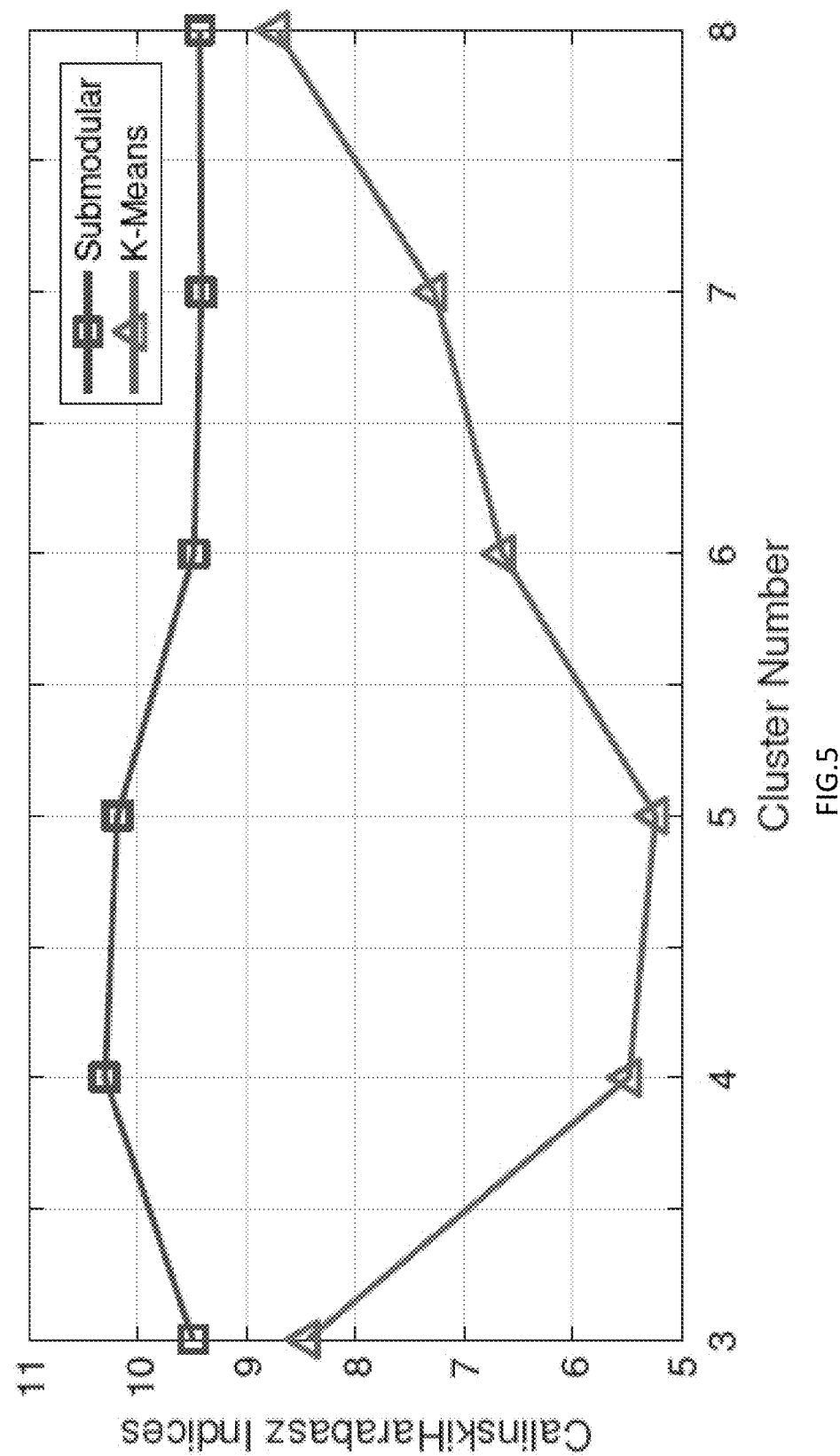
FIG. 5 shows an exemplary Clustering Evaluation

FIG. 5 presents the clustering evaluation with Calinski-Harabasz index. Higher values indicate better clustering results. Compared to K-Means, the instant submodular method reaches better results, and the optimal K is 4.

Figure 6:
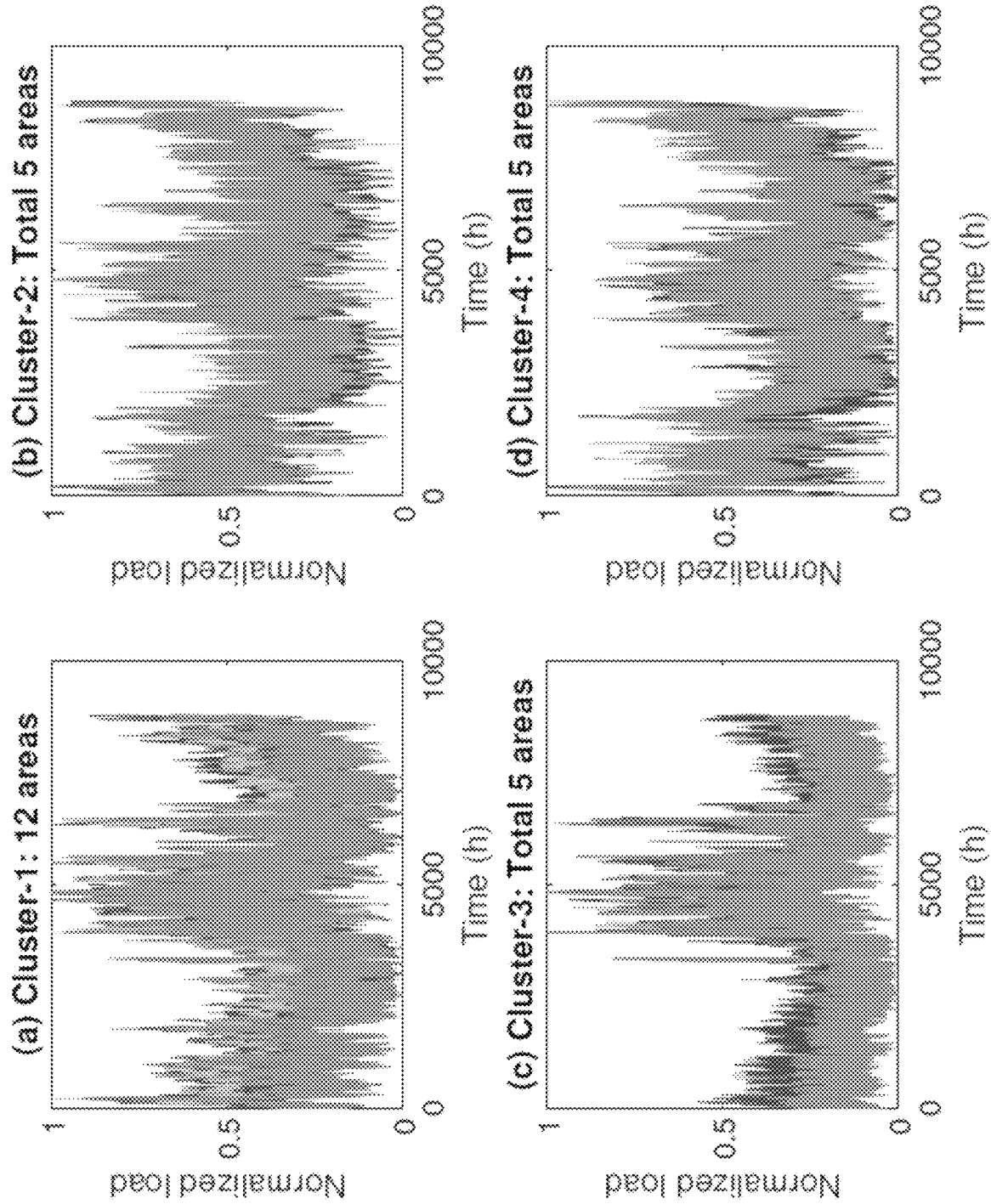
FIG. 6 shows an exemplary Clustering Results for K=4

FIG. 6 shows the clustering results for 4 load groups. Cluster-1 has high summer peak and winter peak with medium level winter average. Cluster-2 is with relatively similar scale in winter and summer peaks, but higher winter average values than Cluster-1. Cluster-3 shows high summer peak and low winter peak. Cluster-4 has medium-high summer peak and high winter peak. Compared with other clusters, Cluster-1 includes the most load areas. This figure demonstrates the clustering capabilities with the instant submodular clustering method to extract representative load features.

As detailed above, the submodular load clustering method efficiently partitions the transmission load areas into several groups for better load analysis applications, especially load modeling or forecasting. Robust principal component analysis is applied to extract low-rank and sparse components from normalized load profiles as well as to mitigate corrupted data quality issues. After extracting representative seasonal features, a submodular cluster center selection technique is used to efficiently rank the load areas as cluster center candidates. Through scanning the ranked list, different number of clusters can be assigned and evaluated without incurring the clustering process repeatedly. In addition, the instant method provides deterministic clustering results without randomness. Numerical results from PJM load demonstrate the effectiveness of the instant method on clustering real transmission-level load areas.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method to manage electrical loads in a grid, comprising:
   applying Robust principal component analysis (R-PCA) to decompose annual load profiles into low-rank components and sparse components;
   extracting one or more predetermined features;

constructing a similarity graph;
selecting submodular cluster centers through the constructed similarity graph;
determining a load cluster assignment based on selected centers;
performing load cluster assignment after obtaining the cluster center rank list or rank set Γ, determining a K-cluster by selecting first K load areas as cluster centers and assigning remaining load areas to load area cluster centers with highest pairwise similarity using:

$$c_i = \max_{j \in \Gamma} w_{ij};$$

applying the load clustering assignment for load analysis with the similarity graph; and
controlling the electrical loads based on the load analysis of the grid.

2. The method of claim 1, comprising performing data normalization.

3. The method of claim 1, comprising selecting a submodular cluster center and applying the selected submodular cluster center to determine one or more optimal cluster centers through the constructed similarity graph.

4. The method of claim 1, wherein the R-PCA is applied to decompose the load time series into low-rank and sparse components to extract key features.

5. The method of claim 1, wherein the submodular selection determines cluster centers.

6. The method of claim 1, comprising a clustering process of ranking load areas in order as the center candidates, where higher order indicates higher priority to be chosen as the cluster centers.

7. The method of claim 6, wherein without repeating the whole clustering process, a different total cluster number K simply requires picking K first candidates and re-assigning load profiles.

8. The method of claim 1, comprising determining rank-k component L to minimize an $l_2$-norm of reconstruction errors between original data M and low-rank component, wherein singular value decomposition (SVD) by:

minimize $\|M-L\|$ subject to rank$(L) \leq k$.

9. The method of claim 1, comprising minimizing a weighted sum of a nuclear-norm of low-rank matrix L and $l_2$-norm of a sparse matrix S, $$\begin{aligned} \text{minimize} \quad & \|L\|_* + \mu \|S\|_1 \\ \text{subject to} \quad & L + S = M \end{aligned}$$

$$\|L\|_* = \sum_p \sigma_p(L)$$

$$\|S\|_1 = \sum_{ij} |S_{ij}|$$

wherein L is the low-rank component of original data matrix M, S is the sparse component of the original data matrix M, p is the p-th singular values in matrix L, i and j are the i-th row and j-th column in matrix S.

10. The method of claim 1, comprising minimizing a weighted sum of a nuclear-norm of low-rank matrix and $L_1$-norm of sparse matrix, where the nuclear norm computes a sum of singular values of a matrix and the $L_1$-norm enforces sparsity for the matrix.

11. The method of claim 1, comprising extracting a seasonal average load, a seasonal load standard deviation, a seasonal maximum load and seasonal minimum load to form an area load feature set.

12. The method of claim 11, comprising performing feature extraction from the load feature set.

13. The method of claim 1, comprising constructing a similarity graph using a similarity matrix and corresponding element for each load area pair.

14. The method of claim 1, comprising
constructing a similarity graph with a similarity matrix W and a corresponding $w_{ij}$ for each load area pair; and
determining a distance metric with $l_2$-norm and similarity metric with radial basis kernel function (RBF) are computed as $d_{ij} = \|z_i - z_j\|_2$ and $$w_{ij} = e^{-\frac{d_{ij}}{\lambda}},$$

where $z_i$ and $z_j$ are the load features for area i and j, λ controls a similarity scaling.

15. The method of claim 1, comprising selecting a load cluster center by initializing each set element which serves as an upper bound to select new set elements.

16. The method of claim 1, comprising determining K load cluster centers from $N^1$ load areas to represent $N^1$ load areas.

17. The method of claim 1, comprising determining K load cluster centers from $N^1$ load areas to represent $N^1$ load areas using:

$$f(\Gamma) = \max_{i \in \Omega} \left( \sum_{i \in \Omega} \max_{j \in \Gamma} w_{ij} \right)$$

subject to card$(\Gamma) \leq K$ wherein with an original set Ω, a selected set Γ is determined to maximize set-wise similarities between the original set Ω and selected set Γ, subject to a cardinality constraint.

18. A power management system, comprising:
a processor with a non-transitory computer readable memory storing a code to manage electrical loads in a grid, the code comprising instructions, when executed by the processor, causing the processor to:
apply Robust principal component analysis (R-PCA) to decompose annual load profiles into low-rank components and sparse components;
extract one or more predetermined features;
construct a similarity graph;
select submodular cluster centers through the constructed similarity graph;
perform load cluster assignment after obtaining the cluster center rank list or rank set Γ, determining a K-cluster by selecting first K load areas as cluster centers and assigning remaining load areas to load area cluster centers with highest pairwise similarity using:

$$c_i = \max_{j \in \Gamma} w_{ij};$$

determine a load cluster assignment based on selected centers with the similarity graph;
apply the load clustering assignment based for load analysis with the similarity graph; and
control the electrical loads based on the load analysis of the grid.

\* \* \* \* \*